July 4, 1967 F. NIERTIT ETAL 3,329,905
HIGH SPEED SWITCHOVER CIRCUIT
Filed May 21, 1964
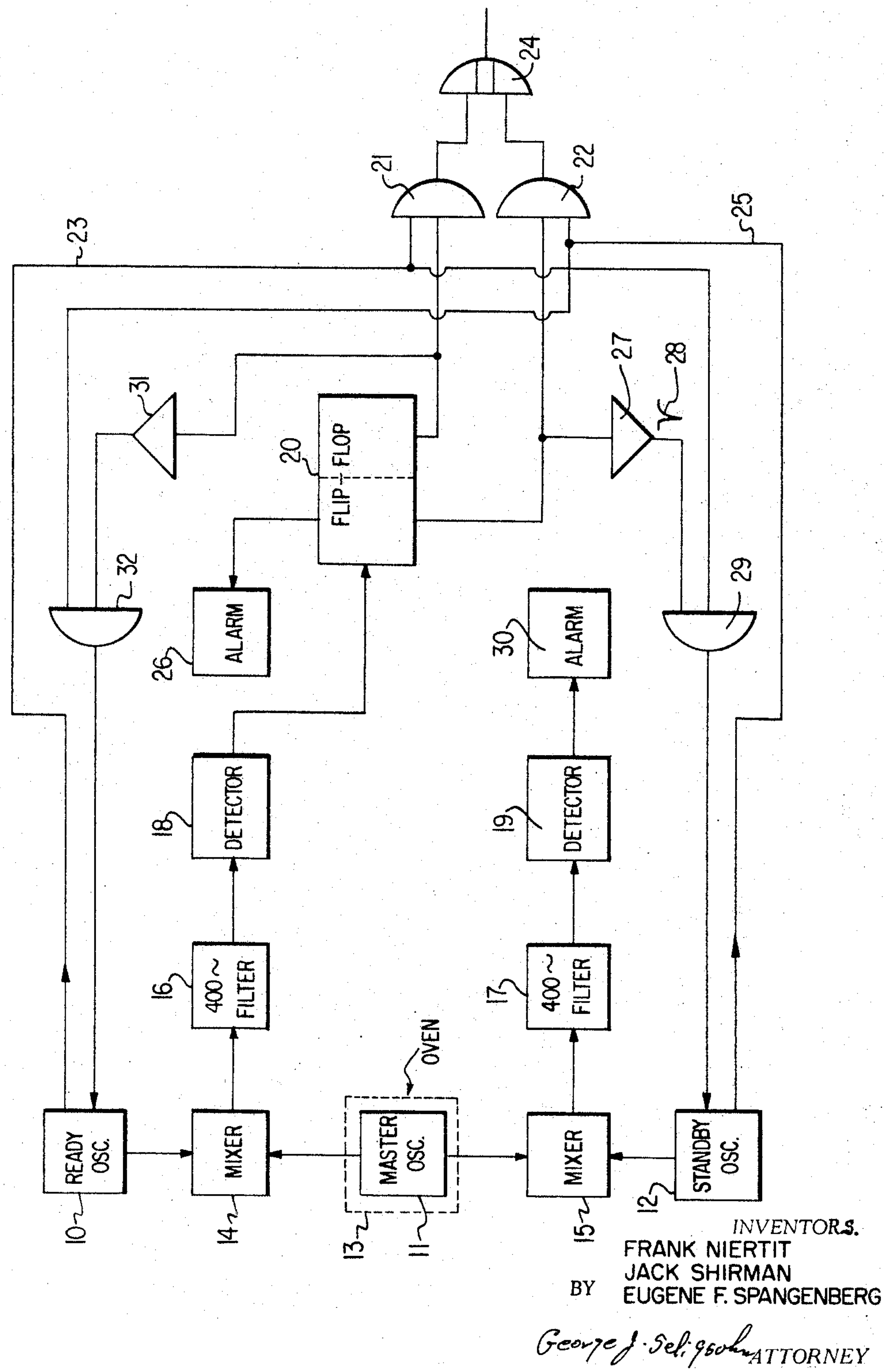
INVENTORS.
FRANK NIERTIT
JACK SHIRMAN
EUGENE F. SPANGENBERG
BY George J. Seligsohn ATTORNEY United States Patent Office 3,329,905

Patented July 4, 1967

3,329,905
HIGH SPEED SWITCHOVER CIRCUIT

Frank Niertit, West Webster, Jack Shirman, Rochester, and Eugene F. Spangenberg, Palmyra, N.Y., assignors to General Dynamics Corporation, Rochester, N.Y., a corporation of Delaware Filed May 21, 1964, Ser. No. 369,111
22 Claims. (Cl. 331—49)

This invention relates to a high speed switchover circuit for instantaneous automatic switchover from a main signal source to a standby signal source without system interruption or loss of continuity.

An example of the use of the clock pulse is timing control in time division multiplex systems in which repetitive time frames are broken up into a plurality of successive time slots. Bits of binary information in successive time slots are applied to the input of delay lines providing a delay of substantially one time frame. The output of the delay line is applied to some utilization circuit and/or passed through a recirculation loop back through the delay line. In either case, since a pulse in passing through the delay line has a tendency to be widened, the coupling circuit for applying the output of the delay line to the utilization means as well as the recirculation loops always includes a reclocking "AND" gate, i.e., a gate which produces an output pulse only in response to the simultaneous application thereto of a clock pulse and an output pulse from the delay line.

It is easy to see that the skipping of even one clock pulse can mean the loss of a binary bit being recirculated in the delay line. Since this binary bit may be part of the stored designation number of a particular telephone, for instance, the loss of a single bit will cause an erroneous designation number to be stored, resulting in a breakdown of the entire system.

Thus, it will be seen that it is essential that not even a single clock pulse be skipped when switchover of clock pulse sources takes place. Since the nominal clock pulse repetition frequency is around one megacycle, the switchover must take place very quickly and, more important, no momentary discontinuity due to a difference in frequency between the main clock pulse source at the time of switchover can be tolerated.

The present invention provides a circuit which will produce a continuous signal with no loss of the signal nor loss of continuity when a standby source is substituted for the ready source. This circuit is intended for use with a system such as the above described time division multiplex system. The addition of pulse shaping means would yield the required clock pulses.

It is therefore an object of this invention to provide a circuit for high speed switchover from a ready to a standby signal source upon failure of the former.

It is also an object of this invention to provide a circuit which will detect failure of the primary signal source and instantaneously substitute a standby source without losing continuity.

Another object of this invention is to provide a high speed switchover circuit which will automatically and instantaneously substitute a standby signal source for a primary signal source which either drifts out of tolerance or fails completely, without losing system continuity.

Another object of this invention is to provide a signal generating circuit with a standby generator so connected to the circuit that its output will be automatically substituted for that of the primary generator should the primary generator deviate from the desired bandwidth.

With the foregoing and other objects in view, the invention resides in the following specification and appended claims, certain embodiments and details of which are illustrated in the accompanying drawing which is a schematic representation of the invention. Each of the blocks here shown represents readily available items well known to those skilled in the electronics arts.

The signals for the circuit are generated by a ready oscillator 10, a master oscillator 11, and a standby oscillator 12 here being 1 megacycle crystal oscillators. The master oscillator is kept in a no-load condition within a constant temperature device such as the oven 13 shown here. Thus, the master oscillator is able to provide a constant reference for the other oscillators and the system.

Outputs from the ready oscillator 10 and master oscillator 11 are fed into a mixer 14. Likewise, outputs from the standby oscillator 12 and master oscillator 11 are fed into mixer 15. The mixers 14 and 15 feed the frequency difference signals to the filters 16 and 17, respectively, which frequency difference signals may each conveniently be 400 cycles per second. Filters 16 and 17 are accordingly each tuned to 400 c.p.s., and a variation of either mixer output from such selected frequency results in a change in the output of the respective filter connected thereto, along with an associated change in the output of the respective amplitude detector 18 or 19 as will be further described herein.

The flip-flop multivibrator 20, which is a bi-stable oscillator, for example an Eccles-Jordan multivibrator, in normal operation controls the gating means so that "AND" gate 21 is enabled, and "AND" gate 22 is inhibited by a ground produced by the flip-flop 20. Thus, the output of the ready oscillator 10 will pass along the path 23, through gate 21 to the output "OR" gate 24. The output from the standby oscillator 12 will pass along the path 25 but will be blocked from the output by the inhibited gate 22.

When an out of tolerance condition is detected by detector 18, the detector will trigger the flip-flop 20, thus transferring the aforementioned ground connection from gate 22 to gate 21, enabling the former and inhibiting the latter. Therefore, the ready oscillator 10 will be cut off from the output gate 24, while the standby oscillator signal is allowed to pass to the output. When the flip-flop 20 is triggered, an alarm 26 or other suitable indicating device, will be set off. As the flip-flop 20 is thus triggered, a negative pulse is applied to differentiating amplifier 27, which in turn provides an output in the form of a sharp negative spike, such as 28. This spike temporarily enables "AND" gate 29 and briefly applies the ready oscillator output to the standby oscillator. The standby oscillator will be temporarily synchronized to the failing ready oscillator, but will rapidly relax to its own fundamental output frequency as gate 29 is again inhibited at the termination of the pulse 28.

In the event that an out of tolerance condition is detected by filter 17 and detector 19, the alarm 30 will be set off. This can occur when the standby oscillator is being used as the prime signal source or while it is acting in its reserve function, in either case indicating a malfunction of oscillator 12. Should both alarms 26 and 30 be triggered, this would indicate that the master oscillator 11 has failed.

Subsequent to such a failure or malfunction of the ready oscillator, with the concomitant take-over by the standby oscillator, it is not uncommon for the ready oscillator to regain a normal operating condition. In this case, the within tolerance frequency difference from mixer 14 will be sensed by filter 16 and detector 18 causing the flip-flop 20 to again be triggered to return to its original state, with ground being applied to and inhibiting gate 22, while gate 21 is enabled. As the flip-flop 20 thus returns to its normal condition, a negative pulse will be applied to differentiating amplifier 31, which in turn will send a sharp negative spike to and enable "AND" gate 32. Thus, the standby oscillator output will briefly be applied to the ready oscillator to synchronize the two oscillators, the ready oscillator will rapidly return to its fundamental output frequency as gate 32 is again inhibited at the termination of the pulse from differentiating amplifier 31.

Thus, this circuit insures that an oscillator output will be applied to the circuit output at all times, and that in the event of a failure the primary oscillator, the standby will automatically and instantaneously be applied to the output without disrupting the system continuity.

The invention may be embodied in other specific forms without departing from the spirit of essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed and desired to be secured by United States Letters Patent is:

1. A circuit for high speed switchover from a ready to a standby signal source comprising: first, second and third signal sources, said first and second sources being connected to a mixer, said mixer being connected to a frequency sensitive detecting means, first gating means interconnecting said first and third signal sources with the circuit output, second normally inhibited gating means interconnecting said first and third signal sources, said first and second gating means being connected to said detecting means and controlled thereby, said first gating means being controlled so that the signal from the first source reaches said output as long as no deviation from a desired bandwidth is detected, said detecting means altering the condition of said first gating means so that the signal from said third source is allowed to reach said circuit output while the signal from said first source is blocked upon detection of an out-of-bandwith condition, and said detecting means briefly enabling said second gating means upon detection of an out-of-bandwidth condition causing said first and third signal sources to be momentarily synchronized.

2. A circuit for high speed switchover from a primary to a secondary signal source according to claim 1 wherein an indicator is connected to said detecting means and energized thereby upon detection of an out-of-bandwidth condition.

3. A circuit for high speed switchover from a primary to a secondary signal source according to claim 1 wherein said second and third signal sources are connected to a second mixer, said second mixer being connected to a second detecting means, said second detecting means being connected to an indicator, said second detecting means causing said indicator to be energized upon detection of an out-of-bandwidth condition.

4. A circuit for high speed switchover from a primary to a secondary signal source according to claim 3 wherein an indicator is connected to said first detecting means and energized thereby upon detection of an out-of-bandwidth condition.

5. A circuit for high speed switchover from a ready to a standby signal source comprising: first, second and master oscillators, said first and master oscillators being connected to a first mixer, said second and master oscillators being connected to a second mixer, first gating means interconnecting said first and second oscillators with the circuit output, second gating means interconnecting said first and second oscillators, first and second frequency-sensitive detecting means being connected to the outputs of said first and second mixers respectively, said first and second gating means being connected to said first detector and controlled thereby, said first detector controlling said first gating means so that only the output of said first oscillator is passed to said circuit output while the output of said second oscillator is blocked and said second gating means is inhibited during detection of signals within a desired bandwidth, said first detecting means causing the condition of said first gating means to be changed during detection of signals outside such desired bandwidth allowing said output of said second oscillator to pass to said circuit output while blocking the output of the first oscillator and briefly enabling said second gating means so that the failing and replacement oscillators are momentarily synchronized, and first and second indicator means connected to said first and second detecting means respectively and being enabled thereby upon detection of signals outside such desired bandwidth.

6. A circuit for high speed switchover from a primary to a secondary signal source comprising: first, second and master signal sources, said first and master signal sources being connected to a first mixer, said second and master signal sources being connected to a second mixer, first gating means interconnecting said first and second signal sources with the circuit output, said first gating means allowing the signal from only one source to pass to the output at any one time, second normally inhibited gating means interconnecting said first and second signal sources, first frequency-sensitive detecting means connected to said first mixer and having an output only upon detection of signals outside a desired bandwidth from said first mixer, said first and second gating means being connected to said first detecting means and controlled thereby, said detecting means controlling said first gating means so that only the output of said first source passes to the circuit output during within bandwidth operation, said detecting means controlling said first gating means so that only the output of said second source passes to the circuit output during out-of-bandwidth conditions, said detector briefly enabling said second gating means upon detection of signals out of the bandwidth so that the output of the failing source momentarily synchronizes the replacement source, second frequency-sensitive detecting means connected to said second mixer and having an output only upon detection of an out-of-bandwidth output from said second mixer, and first and second indicator means energized by the outputs of said first and second detecting means, respectively.

7. A circuit for high speed switchover from a ready to a standby signal source comprising: ready, standby and master signal sources, said ready and master sources being connected to a mixer, first gating means interconnecting said ready and standby sources with the circuit output, second normally inhibited gating means interconnecting said ready and standby sources, means connected to said mixer for detecting a deviation of a selected parameter beyond a selected range at said mixer and having an output only upon such detection, said first and second gating means being connected to said detecting means and controlled thereby, said detecting means controlling said first gating means so that only the output of said ready source is passed to said circuit output as long as no deviation is detected, said detecting means changing the condition of said gating means so that said first gating means passes the standby signal to the circuit output while blocking the output of said ready source, and said second gating means being briefly enabled applying the output of said ready source to said standby source for momentary synchronization thereof upon detection of deviation.

8. The circuit for high speed switchover from a ready to a standby signal source according to claim 7 wherein an indicating means is connected to said detecting means and energized thereby upon detection of deviation.

9. The circuit for high speed switchover from a ready to a standby signal source according to claim 7 wherein said standby and master signal sources are connected to a second mixer, said mixer being connected to a second detecting means, and an indicating means being connected to said detecting means and energized thereby upon detection of deviation.

10. The circuit for high speed switchover from a ready to a standby signal source according to claim 9 wherein an indication is connected to said first detecting means and energized thereby upon detection of a deviation.

11. A circuit for high speed switchover from a primary to a secondary signal source comprising: master, ready and standby oscillators, said ready and master oscillators being connected to a mixer, said mixer being connected to a frequency sensitive filter which serves for determining an operating bandwidth, said filter being connected to detecting means, first gating means interconnecting said ready and standby oscillators with the circuit output, second gating means interconnecting said ready and standby oscillators, said first and second gating means being connected to said detecting means and controlled thereby, said detecting means controlling said first gating means so that only the output of said ready oscillator is passed to said circuit output during normal within bandwidth operation, said detecting means changing the condition of said first gating means so that the output of said standby oscillator is passed to said circuit output, the output of said ready oscillator is blocked from said circuit output and said second gating means is briefly enabled to momentarily synchronize said ready and standby oscillators upon detection of a deviation from the desired bandwidth.

12. A circuit for high speed switchover from a primary to a secondary source according to claim 11 wherein an indicating means is connected to said detecting means and energized thereby upon detection of a deviation from the desired bandwidth.

13. A circuit for high speed switchover from a primary to a secondary signal source according to claim 11 wherein said standby and master oscillators are connected to a second mixer, said second mixer being connected to a second frequency-sensitive filter, said second filter being connected to second detecting means, indicator means connected to said second detecting means and energized thereby upon detection of a deviation from the desired bandwidth.

14. A circuit for high speed switchover from a primary to a secondary signal source according to claim 13 wherein an indicating means is connected to said first detecting means and energized thereby upon detection of a deviation from the desired bandwidth.

15. A circuit for high speed switchover from a primary to a secondary signal source comprising: first, second and third oscillators, said first and second oscillators connected to a mixer, first gating means normally connecting the output of said first oscillator to the circuit output while blocking the output of said third oscillator therefrom, second normally inhibited gating means interconnecting said first and third oscillators detecting means connected to said mixer for detecting a deviation of a selected parameter beyond a selected range at said mixer and having an output only upon such deviation, said first and second gating means connected to said detecting means and controlled thereby, said detecting means altering the condition of said gating means so that said first gating means passes the output of said third oscillator to said circuit output while blocking the output of said first oscillator and briefly enabling said second gating means momentarily synchronizing said first and third oscillators when deviation is detected.

16. A circuit for high speed switchover from a primary to a secondary signal source according to claim 15 wherein an indicator is connected to said detecting means and energized thereby upon detection of deviation.

17. A circuit for high speed switchover from a primary to a secondary signal source according to claim 15 wherein said standby and master oscillators are connected to a second mixer, said mixer being connected to a second detecting means, an indicator connected to said second detecting means and energized thereby upon detection of deviation.

18. A circuit for high speed switchover from a primary to a standby signal source according to claim 17 wherein an indicator is connected to said first detecting means and energized thereby upon detection of deviation.

19. A circuit for high speed switchover from a ready to a standby signal source according to claim 1 wherein said detecting means comprises: a master signal source, a mixer connected between said master and ready signal sources for heterodyning the outputs of said sources, frequency sensitive filter means connected to the output of said mixer, detector means connected to the output of said filter means responsive to a deviation of the heterodyned signal from a given bandwidth determined by said filter, said detector conditioning said first gating means to pass only said standby signal upon detection of a deviation of the heterodyned signal.

20. A circuit for high speed switchover from a ready to a standby signal source according to claim 2, wherein said standby signal source is connected to a second detecting means, said second detecting means comprising: a second mixer interconnecting the master and standby signal sources, a second frequency sensitive filter connected to the output of said mixer, second detector means connected to the output of said filter responsive to a deviation of the heterodyned output of said second mixer from a desired bandwidth determined by said second filter and energizing an alarm upon detection of such deviation.

21. A circuit for high speed switchover from a ready to a standby signal source according to claim 2 wherein a bistable oscillator is interconnected between said first gating means and the output of said first detector and triggered thereby, alarm means connected to said oscillator responsive to a change in state thereof, each half of said bistable oscillator being connected to that part of said first gating means associated with a respective one of said signal sources, either half of said oscillator enabling a part of said first gating means at all times, said first detector triggering said causing it to change in state enabling one part of said first gating means at all times, said first detector triggering said causing it to change in state enabling one part of said first gating means, disabling the other part of said first gating means, and energizing an alarm upon detection of a duration of the heterodyned signal.

22. A circuit for high speed switchover from a ready to a standby signal source according to claim 4 wherein a bistable oscillator is interconnected between said second gating means and the output of said first detector and triggered thereby, said oscillator briefly enabling said second gating means causing said signal sources to be momentarily synchronized upon receipt of a trigger pulse from said first detector.

References Cited

UNITED STATES PATENTS

| | | | |
|---|---|---|---|
| 2,773,944 | 12/1950 | Karlson | 328—71 X |
| 2,992,363 | 7/1961 | Granquist | 331—49 X |
| 3,116,477 | 12/1963 | Bradbury | 331—49 X |
| 3,265,987 | 8/1966 | Hahnel | 331—49 |

ORIS L. RADER, *Primary Examiner.*

T. J. MADDEN, *Assistant Examiner.*